United States Patent [19]

Kennedy

[11] 3,809,245
[45] May 7, 1974

[54] SEWAGE TREATMENT APPARATUS
[76] Inventor: Sterling R. Kennedy, 3460 Hollenberg Dr., Bridgeton, Mo. 63044
[22] Filed: Jan. 31, 1972
[21] Appl. No.: 222,229

[52] U.S. Cl.................. 210/207, 210/220, 210/532
[51] Int. Cl............................................ B01d 21/00
[58] Field of Search ....... 210/63, 84, 202, 207, 208, 210/221, 260, 294, 512, 533, 536, 220, 259, 252, 538–540, 532

[56] References Cited
UNITED STATES PATENTS
839,892 1/1907 Rottmann ...................... 210/202 X
3,627,136 12/1971 Mackrle .......................... 210/512 X
3,595,396 7/1971 Mackrle .......................... 210/208 X Primary Examiner—Samih N. Zaharna
Assistant Examiner—F. F. Calvetti
Attorney, Agent, or Firm—John D. Pope, III

[57] ABSTRACT

A sewage treatment apparatus having an aeration circulation system for separating sludge from sewage wherein sewage is circulated around an outlet port shielded by a circulation guide member. The circulating sewage causes solid matter contained therein to move radially away from the outlet port so that liquid entering the outlet port is substantially free of solids.

16 Claims, 3 Drawing Figures 3,809,245

SEWAGE TREATMENT APPARATUS

This invention is directed to new and useful improvements in sewage treatment apparatus and more particularly to a sewage treatment apparatus having an aeration circulation system for separating sludge from sewage.

Sewage treatment processes are generally classified as primary and secondary, the primary treatment usually involving a trapping of floating, suspended and settleable solids. Secondary treatments generallly involve a chemical processing of the sewage although the line between primary and secondary treatments cannot always be sharply drawn.

Some well known methods for trapping suspended, settleable, or floating solids involve the use of screen and filter devices. These devices have a tendency to clog and must often be cleaned or replaced on a regular basis. Maintenance of this type is time consuming, costly and can necessitate temporary shutdowns of a sewage treatment apparatus.

Among the several objects of the present invention may be noted the provision of a novel sewage treatment apparatus; a novel sewage treatment apparatus which eliminates sludge-separating screens and filters; a novel sewage treatment apparatus substantially free of moving parts; a novel sewage treatment apparatus for separating sludge from sewage by means of a novel aeration system; a novel sewage treatment apparatus having a novel liquid circulation chamber; a novel sewage treatment apparatus which separates sludge from sewage by circulating sewage along a generally circular path; a novel sewage treatment apparatus employing air to circulate the sewage on a generally circular path; and a novel sewage treatment apparatus having a novel outlet port, shield arrangement and air flow system for extracting sludge from sewage. Other objects and features will be in part apparent and in part pointed out hereinafter.

The present invention relates to a novel primary sewage treatment apparatus for extracting sludge from sewage. In one embodiment of the invention the sewage treatment apparatus comprises a primary liquid circulation chamber wherein sewage is circulated around a curved circulation guide barrier that shields an outlet port. The sewage circulates due to the introduction of pressurized air in the chamber liquid which air is directed along a predetermined path, thereby influencing liquid circulation. The circulation guide barrier extends between opposite walls of the primary chamber to prevent the liquid from crossing over the barrier to the outlet port. An entry opening is provided in the barrier leading to the outlet port to ensure that liquid passes into the outlet port along a predetermined path. Under this arrangement the outlet port is located substantially centrally of the circulating liquid, the sludge that is present in the liquid tends to move radially away from the outlet port. Liquid entering the outlet port is thus rendered substantially free of sludge. The radially moving sludge tends to sink to the bottom of the primary circulation chamber and is drawn outwardly therefrom by suction apparatus comprising a perforated suction pipe disposed at the bottom of the chamber.

Liquid passing through the outlet port of the primary circulation chamber enters a flowage chamber containing a flowage outlet duct that conveys the liquid into a second circulation chamber. Liquid movement through the flowage outlet duct is aided by air pumped into the flowage chamber, which air also passes through the flowage outlet duct. The second circulation chamber circulates the liquid in a manner similar to that described for the primary circulation chamber. The second circulation chamber also includes a scum-collection trough for removal of the scum floating on the liquid surface. Following secondary circulation the liquid passes into a collection chamber that pools the circulated liquid. The collection chamber includes weirs for skimming a surface layer of the pooled water and drainage pipes associated with the weirs for finally removing the skimmed liquid from the sewage treatment apparatus.

The invention accordingly comprises the constructions hereinafter described, the scope of the invention being indicated in the following claims.

In the accompanying drawings, in which one of various possible embodiments of the invention is illustrated, FIG. 1 is a perspective view of a sewage treatment apparatus incorporating the present invention;

Corresponding reference characters indicate corresponding parts throughout the several views of the drawings.

Figure 1:
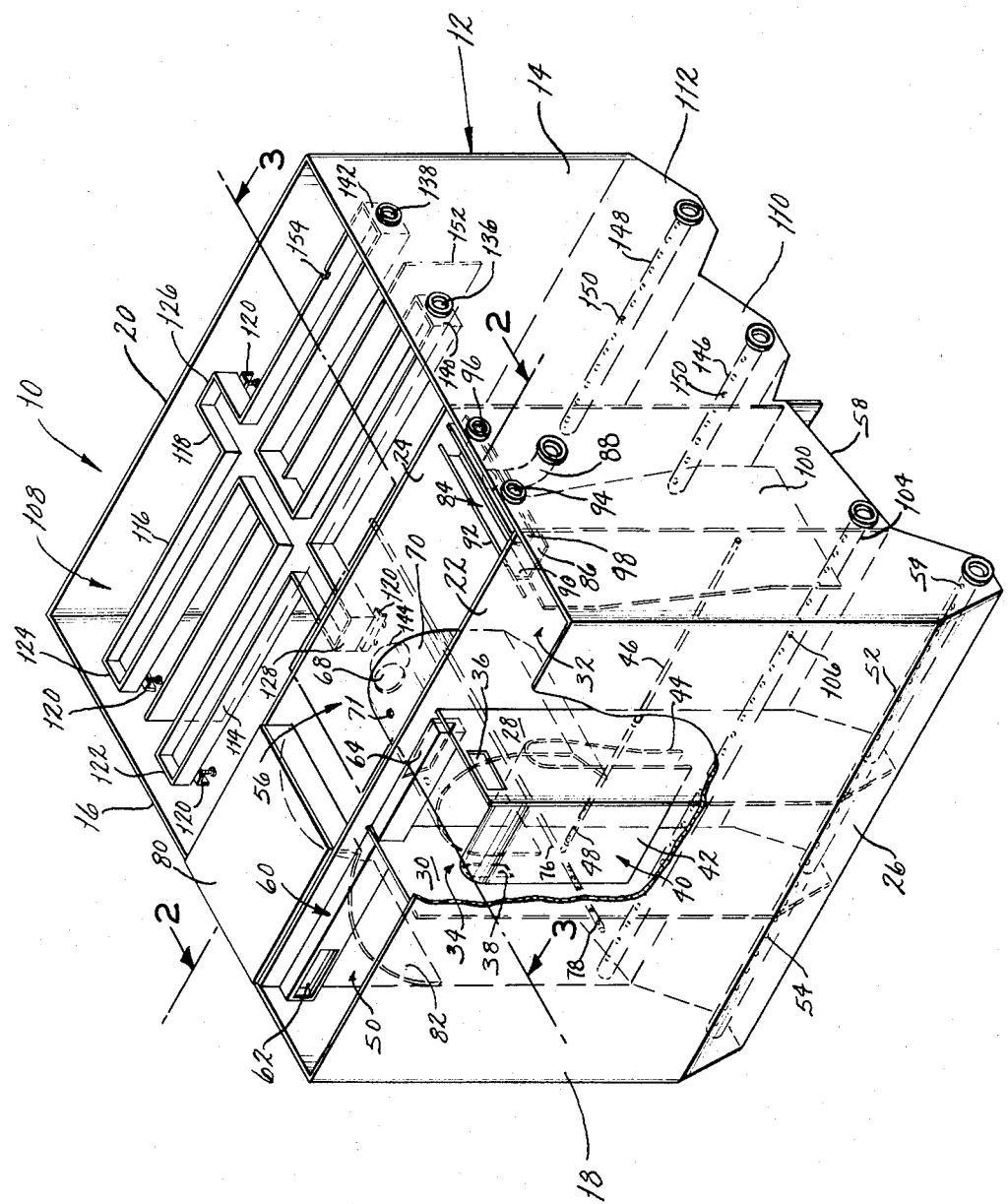

Referring to the drawings for a detailed description of the present invention, a sewage treatment apparatus incorporating one embodiment thereof is generally indicated by reference numeral 10. Sewage treatment apparatus 10 comrpises a multi-chamber housing 12 made of any suitable material such as steel. Housing 12 comprises exterior oppositely disposed sidewalls 14, 16 and 18, 20. Opposite sidewalls 14, 16, are of similar size and shape while sidewall 18 is of a larger vertical dimension than opposite sidewall 20. Housing 12 also includes spaced inner partitions 22 and 24 extending between opposite sidewalls 14 and 16. The space between sidewall 18 and partition 22 is provided with a hopper bottom 26 and which space is subdivided by spaced and parallel baffles 28 and 30 extending between sidewall 18 and partition 22. The bottom portions of baffles 28 and 30 conform in shape with hopper bottom 26. The enclosure bounded by sidewalls 14, 18, baffle 28 and partition 22 comprises a sewage inlet chamber generally indicated by reference numeral 32. Inlet chamber 32 includes a conventional grating (not shown) and a conventional grinder (not shown) for reducing most of the sewage materials entering housing 12 to a uniform pulp. Housing 12 further comprises a primary circulation chamber 34 bounded by baffles 28 and 30, sidewall 18 and partition 22. Baffle 28 includes a sewage inlet opening 36 which feeds sewage from inlet chamber 32 to primary circulation chamber 34. Baffle 30 is provided with an outlet port 38 opposite to and spaced below the level of inlet opening 36. Primary circulation chamber 34 further includes a U-shaped sheet-like barrier 40 formed around a peripheral portion of outlet port 38 such that port 38 is disposed in a concave zone of barrier 40. Barrier 40 extends from baffle 30 to baffle 28 and is fastened to baffles 30 and 28 by welding, for instance. Barrier 40 includes spaced depending leg portions 42 and 44 defining a channel-like entry opening 45 to outlet port 38. An air-pressure pipe 46 disposed between barrier leg 44 and partition 22 is supported by baffles 28 and 30 and extends through inlet chamber 32 outwardly of housing 12. The segment of pipe 46 within primary chamber 34 is provided with air-exit perforations 48 opening away from hopper bottom 26.

Housing 12 further comprises a flowage chamber 50 bounded by sidewalls 18 and 16, partition 22 and baffle 30. A sludge suction pipe 52 is disposed in hopper bottom 26 and extends through chambers 32, 34 and 50. Pipe 52 includes peripheral sludge inlet perforations 54 along its entire length within housing 12. Pipe 52 is arranged to extend outwardly of housing 12 at sidewall 14, the junction of pipe 52 with sidewall 14 being a fluid-tight seal.

Housing 12 further includes a secondary circulation chamber 56 adjacent to and extending the combined length of chambers 32, 34 and 50. Secondary circulation chamber 56 is bounded by opposite sidewalls 14, 16 and partitions 22, 24. Chamber 56 also includes a flat bottom floor 58 downwardly inclined from partition 24 to partition 22. A flowage outlet duct 60 extends along partition 22 within chambers 34 and 50 and includes an opening 62 communicating with flowage chamber 50. Flowage outlet duct 60 also includes an oppositely disposed opening 64 communicating with secondary circulation chamber 56 through a cutout 66 provided in partition 22. A secondary circulation chamber outlet port 68 is provided in partition 24 and includes a generally U-shaped sheet-like barrier 70 formed around a peripheral portion of outlet port 68 such that port 68 is disposed in a concave zone of barrier 70. Barrier 70 extends between partitions 22 and 24 and includes spaced depending leg portions 72 and 74 defining a channel-like entry opening 75 to outlet port 68. An air-pressure pipe 76 disposed between barrier leg 74 and sidewall 16 is supported by partition 24 and extends outwardly of housing 12 through sidewall 20. The segment of pipe 76 within chamber 56 is provided with air-exit perforations 78 opening away from chamber floor 58.

Secondary circulation chamber 56 further includes a hollow eave member 80 secured to sidewall 16 and extending between partitions 22 and 24. Eave member 80 includes a curved concave surface 82 spaced from and facing barrier 70. Secondary circulation chamber 56 further includes a scum trough 84 adjacent sidewall 14 and extending between partitions 22 and 24. Scum trough 84 includes a base 86 having a drain pipe 88 extending therefrom through sidewall 14 and outwardly of housing 12. Trough 84 further includes a lip 90 having an inclined plate 92 secured thereto. A pair of air-exit openings 94 and 96 are disposed in sidewall 14 over scum trough 84 and communicate with air-exit pipes (not shown) secured to sidewall 14 and extending outwardly of housing 12. An L-shaped shield member 98 secured to sidewall 14 adjacent openings 94 and 96 extends between partitions 22 and 24. Secondary circulation chamber 56 also includes a plate-like baffle member 100 disposed intermediate barrier leg 72 and sidewall 14. Baffle member 100 extends between partitions 22 and 24 and has an upper edge 102 spaced below base 86 of scum trough 84. A sludge suction pipe 104 is disposed at the intersection of chamber floor 58 and partition 22 which is the lowest portion of secondary circulation chamber 56. Suction pipe 104 extends from wall 16 through baffle 100 to wall 14 and thereafter is arranged to extend outwardly of housing 12 at wall 14. Pipe 104 includes peripheral sludge inlet perforations 106 along its entire length within chamber 56.

Housing 12 also includes a collection chamber 108 adjacent secondary circulation chamber 56. Collection chamber 108 is bounded by sidewalls 14, 20, 16 and partition 24. Collection chamber 108 includes double hopper bottoms 110 and 112 and channel-type crossweirs 114, 116 and 118 mutually communicating with one another. Weir level adjusters 120 are provided at ends 122, 124, 126 and 128 of weirs 114, 116, and 118, respectively. Weir level adjusters 120 comprise an angle having one leg 130 secured to sidewall 16, for instance, and another leg 132 projecting from wall 16 into chamber 108. Leg 132 is provided with a pair of adjusting screws 134 arranged to support weir ends 122 and 124 of weirs 114 and 116, for instance. The height of weir ends 122 and 124 can be varied with respect to leg 132 by rotation of adjustment screws 134. A pair of weir drains 136, 138 are provided at corresponding ends 140, 142 of weirs 114 and 116, respectively, which drains are arranged to communicate with drain pipes (not shown) extending from sidewall 14 outwardly of housing 12. Weirs 114 and 116 are shallower at ends 122, 124 than at ends 140, 142. Collection chamber 108 further includes an inlet elbow pipe 144 in partition 24 communicating with outlet port 68 of secondary circulation chamber 56. Inlet elbow pipe 144 is spaced below weirs 114, 116 and 118, and opens toward double hopper bottoms 110, 112. A pair of sludge-suction pipes 146, 148 are disposed on hopper bottoms 110, 112, respectively. Pipes 146, 148 include peripheral sludge inlet perforations 150 and are arranged to extend outwardly of housing 12 at wall 14. A short stilling baffle member 152 spaced from hopper bottoms 110, 112 is disposed between weirs 114 and 116 and extends from wall 14 to wall 16.

In operation of sewage treatment apparatus 10, cover plates (not shown) are normally placed over each chamber in housing 12 so that housing 12 is essentially sealed from the outside air. Incoming sewage is fed into inlet chamber 32 where it passes through a grate (not shown) and is then ground by a conventional grinder (not shown). It should be noted that the incoming sewage is grated to remove debris such as rocks, twigs and other solid materials that cannot be easily ground. The grinder helps reduce the grindable sewage to a uniform consistency. The heavier sludge in the sewage immediately sinks to hopper bottom 26 and is periodically drawn into sludge suction pipe 52 through sludge inlet perforations 54 by suction apparatus (not shown).

Figure 3:
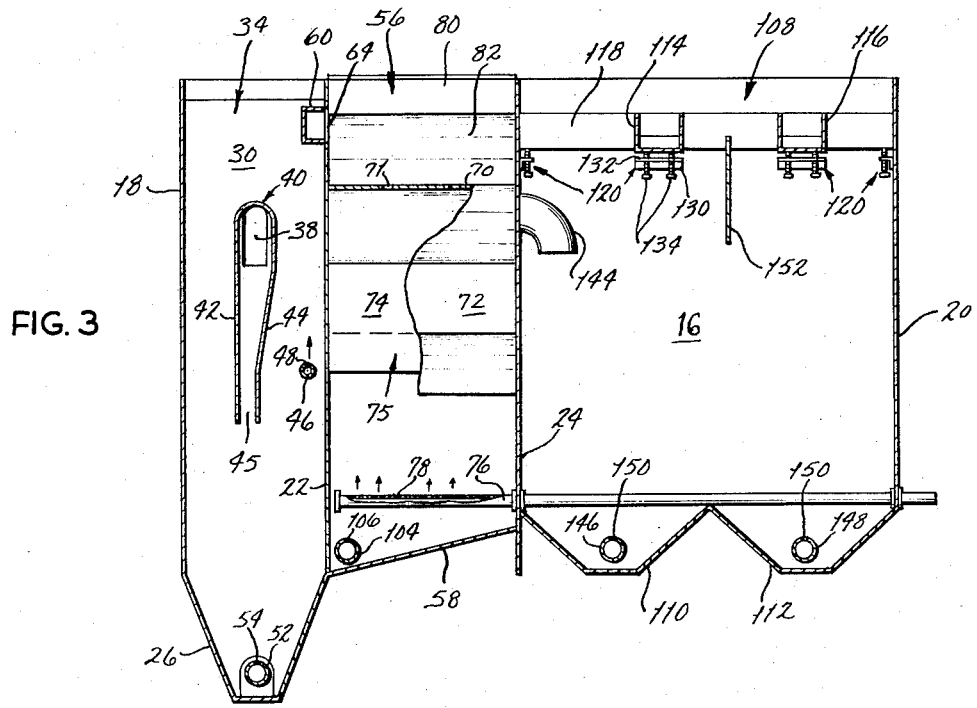
FIG. 3 is a sectional view thereof taken on the line 3—3 of FIG. 1.

Sewage enters primary circulation chamber 34 through inlet opening 36 in baffle 28 and fills the primary chamber to a level which approaches but does not reach the upper edges of baffles 28 and 30. Conventional air supply equipment (not shown) is interconnected to pipe 46 to pump pressurized air through air-exit perforations 48 into primary circulation chamber 34. Perforations 48 are arranged in air pipe 46 to permit air to issue therefrom in a substantially upward direction toward the liquid surface. This efflux of air is continuous and causes the sewage to flow away from air pipe 46 along a circulatory path that is in part defined by barrier 40 which serves as a circulation guide member for the sewage. Under the circulation guide arrangement of barrier 40 the sewage moves from air pipe 46 in a counterclockwise direction around barrier 40, as viewed in FIG. 3. The circulating movement of the sewage tends to cause the sludge that is present therein to move radially away from barrier 40 so that circulating liquid which passes through entry opening 45 of barrier 40 to outlet port 38 is relatively sludge-free. In this manner liquid passes through outlet port 38 along a predetermined path defined by entry opening 45. The sludge particles, after radially moving to the periphery of the circulatory path, tend to sink toward hopper bottom 26 and are periodically drawn into suction pipe 52 through sludge inlet perforations 54.

The relatively sludge-free liquid passing through outlet port 38 enters flowage chamber 50, which chamber is subjected to air-pressure from an external source that is not shown. The air-pressure in flowage chamber 50 aids the flow of liquid through opening 62 in duct 60 and further aerates the liquid. A portion of opening 62 always remains above the liquid surface level in flowage chamber 50 to ensure that liquid plus air can flow through duct 60 toward opposite duct opening 64 which leads into secondary circulation chamber 56. As sludge suction pipe 52 also extends into flowage chamber 50, any sludge which settles to hopper bottom 26 of chamber 50 is periodically drawn into suction pipe 52 as previously described.

Figure 2:
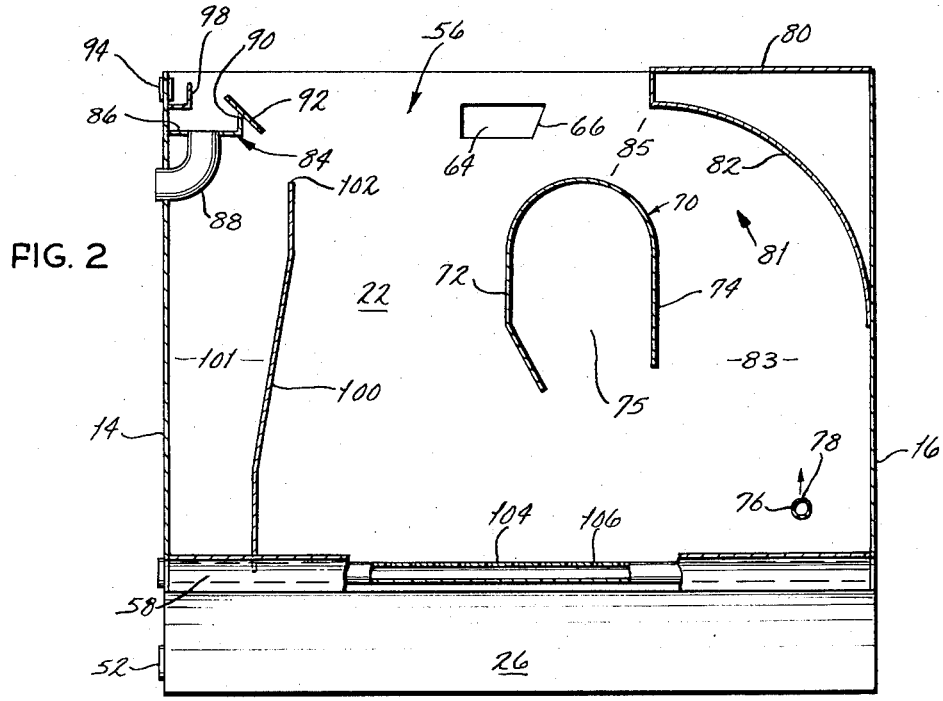
FIG. 2 is a sectional view thereof taken on the line 2—2 of FIG. 1.

Secondary circulation chamber 56 operates similarly to primary chamber 34. Pressurized air issues from perforations 78 of pipe 76 to cause liquid to circulate in a counterclockwise direction around barrier 70, as viewed in FIG. 2. Eave member 80 and barrier 70 serve as guide members for the circulating liquid with the spacing between eave member 80 and barrier member 70 defining a guide course 81 through which the liquid flows. It will be noted that the space between eave member 80 and barrier leg 74 at an end 83 of guide course 81 is greater than the spacing between eave member 80 and barrier 70 at an end 85 of guide course 81, thereby providing a venturi or nozzle effect to the liquid as it circulates from end 83 to end 85. Thus liquid entering secondary circulation chamber 56 through cutout 66 is driven in a counterclockwise direction around barrier 70 (FIG. 2) by the liquid that circulates past end 85 of guide course 81. Under this arrangement solid particles entering chamber 56 are urged over baffle 100 into a trap space 101 bounded by baffle 100, sidewall 14 and partitions 22, 24. Solid particles entering trap space 101 eventually sink toward floor 58 and sludge suction pipe 104 for disposal in a manner previously described for suction pipe 52. The circulating liquid also causes solid particles in secondary circulation chamber 56 to move radially away from barrier 70 such that liquid passing through entry opening 75 to outlet port 68 in partition 24 is substantially free of solid material. Further, the sludge particles, after radially moving to the periphery of the circulatory path, tend to sink toward floor 58 and sludge suction pipe 104 for disposal in a manner previously described. If desired, openings 71 can be provided in barrier 70 to permit escape of any air trapped thereunder. Similar openings can be provided in barrier 40. Any floating scum at the liquid surface level in secondary circulation chamber 56 is drawn toward scum trough 84 by the counterclockwise movement of circulating liquid and also by the movement of air within chamber 56 toward air-exit openings 94, 96 positioned over scum trough 84. Inclined plate 92 facilitates movement of scum into trough 84 and helps to prevent scum from backing off trough 84 into the circulating liquid. Shield member 98 prevents scum or liquid from entering air-exit openings 94, 96. In this manner floating and settleable solids in secondary circulation chamber 56 are isolated from outlet port 68 and substantially solid-free liquid passes through inlet elbow pipe 144 into collection chamber 108.

Weirs 114, 116, 118 of collection chamber 108 are arranged to permit a portion of the surface layer of liquid in chamber 108 to overflow into the weir channels. The overflow or skimmed liquid is directed toward weir drains 136 and 138 for final removal from apparatus 10. Weirs 114 and 116 are inclined downwardly from sidewall 16 of housing 12 to sidewall 14. This inclination is due to the relative shallowness of weirs 114, 116 at weir ends 122, 124 as compared to weir ends 140, 142. The inclination of weirs 114, 116 and 118 from sidewall 16 to sidewall 14 can be manually controlled by adjusting screws 135 in weir level adjusters 120. If desired the sidewalls of weirs 114, 116 and 118 can be notched as shown at 154 to facilitate skimming of liquid onto the weirs. Stilling baffle 152 serves to minimize lateral movement of liquid in collection chamber 108. Should any solid materials be present in the collection chamber liquid, they will tend to sink toward hopper bottoms 110 and 112 for disposal in sludge suction pipes 146, 148, in a manner previously described. It may be noted that sludge suction pipes 146 and 148 do not extend from sidewall 14 all the way toward sidewall 16. This is because hopper bottoms 110 and 112 incline downwardly from sidewall 16 to sidewall 14. If desired sludge suction pipe 104 in secondary circulation chamber 56 can be similarly foreshortened by arranging chamber floor 58 to incline downwardly from sidewall 16 to sidewall 14.

As the liquid in the presently disclosed apparatus is extensively aerated, aerobic bacteria generally found in sewage have a tendency to thrive. Such bacteria are heavily present in any sludge that accumulates at the bottom of collection chamber 108 and are highly beneficial toward breaking down sludge into harmless constituents. Consequently a transfer pipe (not shown) can be used to interconnect one or both sludge suction pipes 146 and 148 in collection chamber 108 to primary circulation chamber 34 to return some of the collection chamber sludge to primary circulation chamber 34 to accelerate bacterial breakdown of sludge in the primary chamber.

As will be apparent to those skilled in the art, the shape and size of the particular chambers within sewage treatment apparatus 10 can be varied as well as the shape and size of circulation guide members 40, 70. Some advantages of the novel sewage treatmemt apparatus and method for treating sewage evident from the foregoing description include a compact primary apparatus capable of processing a high volume of sewage in a relatively short period of time. This is due in part to aeration circulation of the sewage. For example, an apparatus as disclosed herein built to occupy a total volume of less than 900 cubic feet is capable of processing approximately 200,000 gallons of sewage a day. This is due to a retention time of approximately 10 minutes, i.e., sewage entering apparatus 10 through inlet chamber 32 is treated and removed approximately 10 minutes later from weir drains 136, 138. Excluding the grinder, a further advantage is the absence of any moving parts in the sewage trreatment system. It can also be appreciated that sludge separation is accomplished without sludge-removing screens or filters. Consequently sewage treatment apparatus 10 requires little or no maintenance. Other advantages include a completely enclosed primary sewage treatment system, extensively aerated sewage which promotes the growth of beneficial aerobic bacteria, and suction drainage of the sludge.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. In combination with a liquid chamber, liquid inlet means for delivery of liquid to said chamber, liquid circulation guide means in said chamber for establishing an endless liquid flow path around said guide means, said guide means defining a confined inner space, liquid circulating means for causing movement of liquid around said guide means, liquid outlet means in said chamber for draining liquid from said chamber, said liquid outlet means comprising an entry opening in said guide means for establishing movement into said confined inner space of an inner circulating portion of liquid from said endless flow path, said liquid outlet means further including a chamber outlet opening in said inner space for draining liquid from said chamber.

2. The combination of claim 1 wherein said liquid circulating means include means for directing a flow of gas adjacent said guide means to cause movement of liquid around said guide means.

3. The combination of claim 2 wherein said means for directing a flow of gas adjacent said guide means include a conduit member having peripheral perforations at a predetermined location to effect a flow of liquid around said guide means in a predetermined direction.

4. The combination of claim 2 wherein said means for directing a flow of gas adjacent said guide means include a perforated pipe extending into said chamber spaced from said guide means, said perforations being provided at a predetermined location on said pipe such that the issuance of gas from said perforations causes said liquid to circulate in a predetermined direction around said guide means.

5. The combination of claim 1 wherein said chamber includes chamber walls, said liquid outlet means comprising an opening in one of said chamber walls.

6. The combination of claim 5 wherein said guide means comprises an arcuate plate member extending from said one chamber wall to a second wall opposite said one chamber wall.

7. The combination of claim 6 wherein said guide means further includes spaced free end portions defining the entry opening through which liquid enters said confined inner space.

8. The combination of claim 7 wherein said liquid circulating means comprise means for directing a flow of gas adjacent said guide means such that liquid circulates around said guide means.

9. The combination of claim 8 wherein said liquid circulating means comprise a conduit member adjacent said guide means, said conduit member having perforations in a predetermined location such that the issuance of gas from said perforations causes said liquid to circulate around said guide means in a predetermined direction, said liquid flowing to said chamber outlet opening through the entry opening defined by the spaced free-end portions of said guide means.

10. The combination of claim 1 wherein said liquid circulation guide means comprise first and second guide members spaced from each other such that the spacing between said first and second guide members defines a course through which said circulating liquid flows around said first guide member.

11. The combination of claim 10 wherein said course has a beginning portion and an end portion, and the spacing between said first and second guide members at the beginning of said course is greater than the spacing therebetween at the end of said course such that liquid flowing through said course experiences a nozzle effect.

12. The combination of claim 1 wherein said chamber includes chamber walls, said combination further including baffle means spaced intermediate said guide means and a first wall of said chamber to define a particle trap space between said baffle means and said first chamber wall.

13. The combination of claim 12 wherein said chamber includes a chamber floor, said baffle means comprising a plate extending downwardly toward said floor and joining opposing walls of said chamber.

14. The combination of claim 1 further including a trough provided at the liquid surface level of said chamber opposite said liquid circulating means such that a surface portion of said circulating liquid flows toward and into said trough, said trough further including a drain for drawing liquid that enters said trough outwardly of said chamber.

15. The combination of claim 14 wherein said chamber is sealed, said combination further including gas outlet means at said trough such that gases within said chamber are directed toward said trough, causing surface liquid in said chamber to move toward said trough.

16. The combination of claim 1 wherein said chamber has a bottom and a suction pipe at said bottom, said pipe having perforations therein for drawing sludge into said pipe.

* * * * *